G. SINCLAIR.
PROCESS OF TREATING LIQUIDS.
APPLICATION FILED DEC. 8, 1917.
1,397,550.
Patented Nov. 22, 1921.
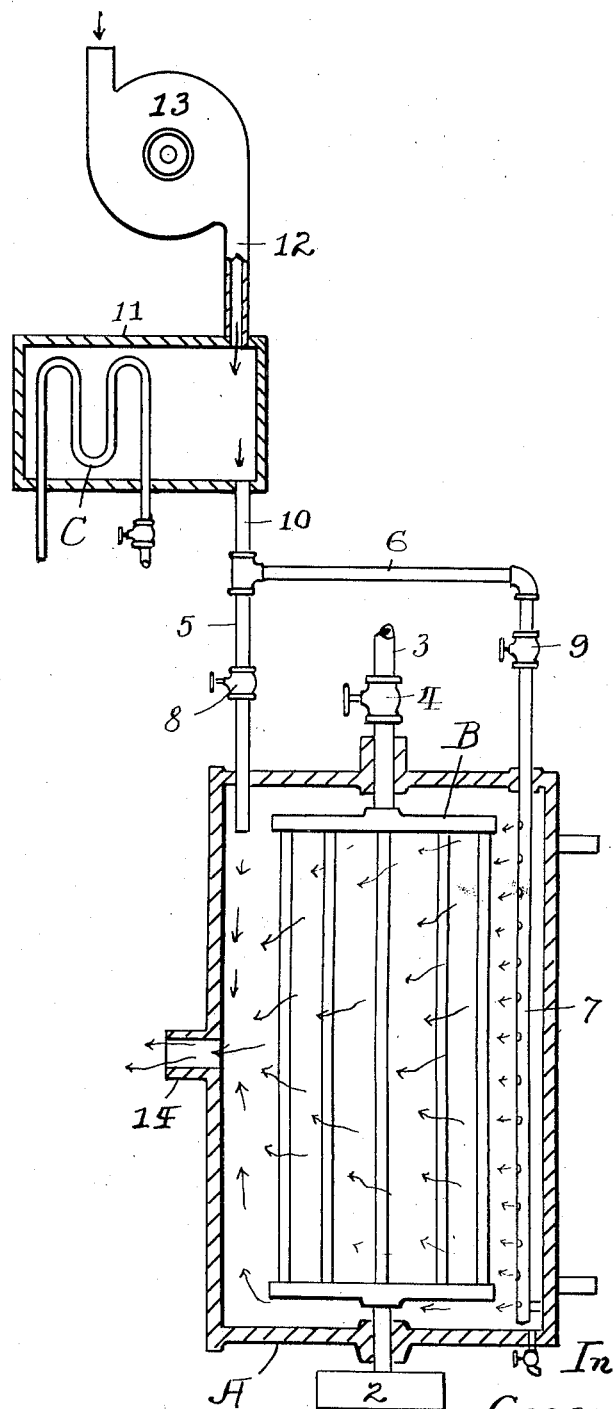
Inventor:
George Sinclair,
by: T. S. Bradbury
Attorney.

UNITED STATES PATENT OFFICE.

GEORGE SINCLAIR, OF TAYLORS FALLS, MINNESOTA.

PROCESS OF TREATING LIQUIDS.

1,397,550.   Specification of Letters Patent.   Patented Nov. 22, 1921.

Application filed December 8, 1917. Serial No. 206,244.

*To all whom it may concern:*

Be it known that I, GEORGE SINCLAIR, a citizen of the United States, residing at Taylors Falls, in the county of Chisago and State of Minnesota, have invented a new and useful Improvement in Processes of Treating Liquids, of which the following is a specification.

This invention relates to a new process of treating liquids and the product of said process, and is especially adapted for the elimination and destruction of the undesirable germs, which cause decay and disease in milk or cream and the cultivation and propagation of the pure milk or cream "seed germ," which gives the milk or cream its agreeable aroma and natural taste, and doing this in such a way that the milk or cream has not the cooked and deadened taste commonly attained by some other processes.

More particularly this invention is an improvement upon the process set forth in Patent Number 1,175,876, granted to me on the 14th day of March, 1916, for method of treating milk or cream. It is well known that sterile milk or cream is considered as being practically free of germ life and that therefore beneficial results upon the digestive canal would naturally be lacking. Hence the milk or cream is an inferior product. This has led to the refertilization of such milk or cream by implantations of cultures of flavoring bacteria as "butter flavor," "flavorine," etc., of pure lactic acid bacteria and pure lactic acid in an attempt to rehabilitate the milk or cream in which the germs have been destroyed. This seed germ, referred to above, after in incubation in which it is not retarded by harmful bacteria and impurities, and thus obliged to fight for its existence develops a most essential flavor in the milk or cream, and remain sufficiently resistant to withstand the final or pasteurizing heat, and remain as an active agent in the milk or cream when consumed. This beneficial result is still further produced by my improved process and the resulting product is milk or cream highly flavored and substantially free from impurities.

It is well known that milk and cream are affected by the sanitary condition of the dairy where drawn and by its later care and treatment, and it is an object of this process to remove the impurities in the milk or cream tending to taint the same and to develop the beneficial and valuable part of the germ life as soon as possible. Naturally the sooner treated after being drawn, the better, as the harmful germs have not had a change to develop and compete with the beneficial germ. The presence of a suitable degree of heat and lactic acid greatly increases the activity of the beneficent germ (such as *B. acidi lacti*), and it is the opinion of some that this germ overcomes the harmful germ life and eliminates it.

With this end in view, my invention consists broadly in raising the temperature of the milk or cream to approximately about 145 to 150 degrees Fahrenheit, the application of such heat being regulated according to the amount of contamination in the milk or cream as determined by bacteriological tests or otherwise. During this heating operation and thereafter during the entire process, the milk or cream is subjected to the flow of sterile air over, about or up through the same. The milk or cream is next flashed to approximately 170 to 185 degrees Fahrenheit to assure the further killing of germs and then cooled to a ripening temperature of from 50 to 65 degrees Fahrenheit for from about 48 to 96 hours, or that best suited to cause the development of germs and of giving the milk or cream its agreeable odor or aroma. The temperature is next further reduced to about 35 to 45 degrees Fahrenheit and held at this temperature for about 12 hours, for the purpose of developing germs and agreeable odor, the impure gases which are developed being scavenged away by the air.

In the accompanying drawing forming part of this specification, the figure is a side elevation partly in section of one form of apparatus by the use of which my improved process can be carried into use.

The milk or cream to be treated is placed in a closed vat A, and its temperature controlled by a revoluble heating coil B in said vat and submerged in the liquid to be treated. This heating coil which is shown as being revolved by the pulley 2 driven by any suitable source of power is supplied with steam or other heating medium by the pipe 3, the supply of steam being opened, closed or regulated by a valve 4. The milk or cream so placed in the vat is raised to a temperature which is sufficient to kill substantially all harmful germs and convert the beneficial ones to spores, said temperature being substantially in the vicinity of 150 degrees Fahrenheit. The milk or cream previous to being treated in the vat is tested to determine the amount of impurities therein, the presence of which affects the odor thereof, and the temperature is raised gradually in the vat until substantially 145 to 155 degrees Fahrenheit is reached, resulting in the elimination or destruction of the weaker and harmful germs, and the conversion of beneficial organisms into their spores. While this step of the process is being carried out the foul and animal odors are carried away from the liquid in the vat by passing a current of purified air over the surface and up through the liquid by means of the air ingress pipes 5 and 6, the pipe 5 leading into the vat above the surface of the liquid and the pipe 6 being submerged in the liquid and provided with port openings 7 through which the air is blown upwardly through the liquid. The pipes 5 and 6 have controlling valves 8 and 9, and both are connected with a supply pipe 10 emanating from a heating element C, which is in the form of a steam coil or other suitable means situated in an inclosure 11, which receives outside fresh air through an ingress duct 12 leading from a blower 13. Thus the foul and animal odors are discharged from the liquid which is thus rendered quite sweet and pure. By careful experiment, it has been found that the best results are obtained by regulating the application of this heat according to the condition of the milk or cream, that is the temperature is raised slowly, if the odor of the milk or cream is excessive or bad, and if good the temperature is raised rapidly, care being taken not to raise the temperature above substantially 155 degrees Fahrenheit, until the odors emanating therefrom have become clean and agreeable. When desired, the air can be washed previous to its use to cleanse it of all impurities. The air after becoming intimately associated with the liquid in the vat exhausts through the duct 14 extending from the upper portion. The agitation of the liquid also promotes intimate contact of the air with the liquid. As the primary application of heat is advanced in degree, the evolution of the gases is correspondingly increased and it will be appreciated that a greater force or flow of washed air through the pipes 5 and 6 will be required to properly cope with such gases to drive them off from the liquid through the exhaust duct 14. This regulation of air and heat can be controlled by operating the valves 4, 8 and 9. The liquid in the vat after the odor has become clean and agreeable is next flashed to a temperature of approximately 170 to 185 degrees Fahrenheit and then cooled to a ripening temperature of from 53 to 65 degrees Fahrenheit or that best adapted for the development of the germ giving the milk or cream its agreeable flavor or aroma. During the second or rapid heating of the liquid a flow of the sterile air is directed thereover and therethrough in order to remove any further possible foul odors remaining after the primary treatment or which might generate during the flash. After flashing, the temperature of the liquid is reduced to approximately 50 to 55 degrees Fahrenheit, at which temperature it is maintained for from 48 to 96 hours, varying in length of time according to the condition of the milk. When vegetation is very rapid, this temperature is maintained for the shorter period, and when vegetation is slack, the longer period of treatment is required. This continued temperature causes the propagation of the seed germ, part of the sugar being converted into lactic acid. This simulates as closely as possible a natural purifying process. When this step is completed the temperature is next reduced to about 35 to 45 degrees Fahrenheit, and the milk or cream held for a period of time extending about 12 hours. During both of these last steps, sterile air at substantially the same temperature of the milk is circulated over and through the milk or cream, thus removing substantially all impure gases generated by the action. The resulting product is milk or cream substantially free of all impurities, the air carrying off the obnoxious gases and the pure germ in the milk or cream feeding on the tissue of the impure germ.

Having described my invention what I claim as new and desire to protect by Letters Patent is:

A process of preparing milk or cream containing a germ valuable to the digestive system consisting of gradually heating the milk or cream to about 145 to 150 degrees Fahrenheit to inure the germ and its spores to an increased temperature and to destroy deleterious organisms, meanwhile introducing sterile air in intimate contact with the milk or cream, next flashing the temperature to about 170 to 185 degrees Fahrenheit to destroy deleterious organisms remaining, then cooling the milk or cream to about 50 to 65 degrees Fahrenheit and incubating at that temperature for a period ranging from 48 to 96 hours to propagate the seed germ to develop agreeable aroma from the milk or cream, and finally reducing said temperature to and maintaining said temperature at about 35 to 45 degrees Fahrenheit for an extended period, the said introduction of air being continued during said steps to scavenge away substantially all foul gases liberated by the milk or cream.

In testimony whereof, I have signed my name to this specification.

GEORGE SINCLAIR.